United States Patent

[11] 3,623,764

| | | |
|---|---|---|
| [72] | Inventor | John L. Jacobus<br>Roseville, Mich. |
| [21] | Appl. No. | 36,948 |
| [22] | Filed | May 13, 1970 |
| [45] | Patented | Nov. 30, 1971 |
| [73] | Assignee | General Motors Corporation<br>Detroit, Mich. |

[54] CLOSURE INSTALLATION
3 Claims, 5 Drawing Figs.

[52] U.S. Cl. .................................................. 296/50,
16/148, 49/192, 182/90, 280/166, 292/216,
296/57 R
[51] Int. Cl. ..................................................... B60j 5/10
[50] Field of Search ........................................... 296/50, 57;
280/166; 49/69, 192; 16/147, 148; 292/216;
182/90

[56] References Cited
UNITED STATES PATENTS

| | | | | |
|---|---|---|---|---|
| 3,164,394 | 1/1965 | Husko et al. ................... | | 280/166 |
| 3,567,274 | 3/1971 | Kaptur et al. .................. | | 296/50 |

*Primary Examiner*—Benjamin Hersh
*Assistant Examiner*—Leslie J. Paperner
*Attorneys*—W. E. Finken and D. L. Ellis ABSTRACT: A closure installation for a step recess in a bumper structure on a vehicle body, the latter including an access opening and a primary closure or tailgate swingable relative to the opening between a closed position wherein a hinge-latch support structure portion of the tailgate projects into the bumper structure recess and respective ones of two open positions as a door or as a drop gate, the closure installation including a secondary closure on the bumper structure movable between open and closed positions relative to the recess in the latter, link means between the bumper structure and the secondary closure and a control pin on the support structure operable to activate the link means to close the secondary closure behind the tailgate when the latter is moved to the closed position from either open position and to open the secondary closure in advance of the tailgate when the latter is moved from the closed to either of the open positions.

PATENTED NOV 30 1971 3,623,764

INVENTOR.
John L. Jacobus
BY
D. L. Ellis
ATTORNEY

INVENTOR
John L. Jacobus

BY
D. L. Ellis
ATTORNEY

CLOSURE INSTALLATION

This invention relates generally to vehicle bodies and more particularly to means for selectively closing a recess in a bumper structure thereon.

In a station-wagon-type vehicle having a tailgate of the type which is swingable either as a drop gate about a horizontal axis of the vehicle body situated below the vehicle rear bumper structure or as a door about a vertical axis of the vehicle body, a protective closure must be provided for the recess in the bumper structure required to house the lower tailgate hinge latch structure when the tailgate is in the closed position and during drop gate operation. In the past, a secondary closure in the form of a cover plate attached directly to the tailgate has been provided to conceal the bumper structure recess in the closed position of the tailgate. Such an arrangement, while concealing the recess, necessarily transmits directly to the tailgate any impacts on the secondary closure or cover plate. In a closure installation according to this invention a secondary closure is provided on the bumper structure which conceals the bumper structure recess in the closed position of the tailgate and which is reinforced to isolate the tailgate from impacts on the secondary closure.

The primary feature of this invention is that it provides an improved closure installation for a bumper structure recess including a secondary closure on the bumper structure and control means operable to move the secondary closure between open and closed positions in response to opening and closing movement of the tailgate. Another feature of this invention resides in the provision of a secondary closure which defines in the open position thereof a horizontal surface generally contiguous with the bottom surface of the bumper structure recess, the contiguous surfaces providing a step on the vehicle body below the level of the load floor therein. A still further feature of this invention resides in the provision of spring means operable to bias the secondary closure toward and to maintain the latter in the open position. Yet another feature of this invention resides in the provision of control means including link means between the secondary closure and bumper structure and a control pin movable unitarily with the tailgate, the control pin engaging the link means during closing movement of the tailgate to bring the secondary closure to the closed position behind the tailgate. These and other features of this invention will be readily apparent from the following specification and from the drawings wherein:

Figure 1:
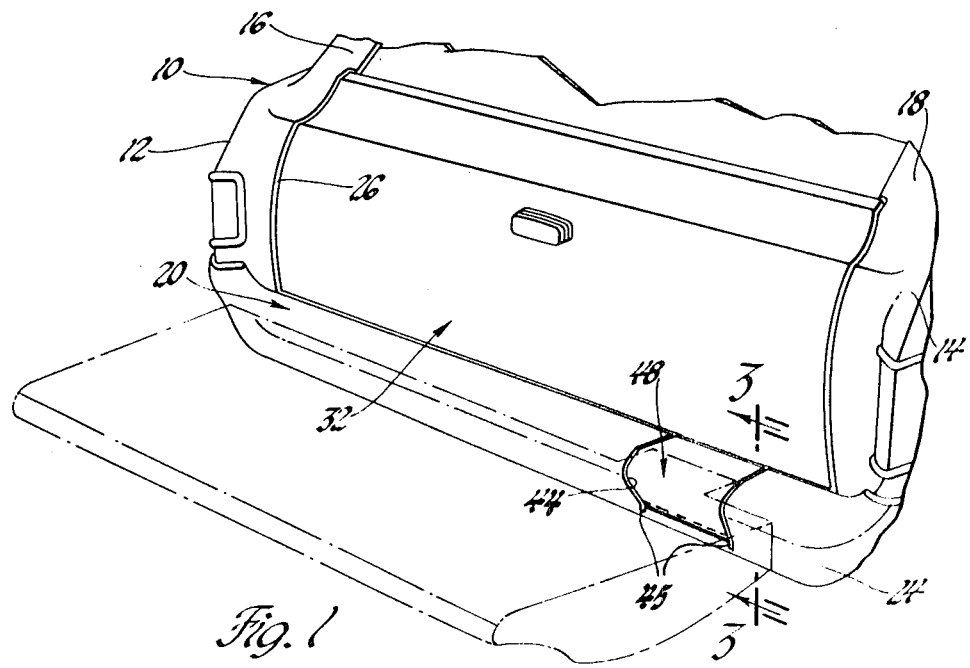
FIG. 1 is a fragmentary perspective view of the rear portion of a station-wagon-type vehicle body having a closure installation according to this invention and showing the tailgate in the closed and in the drop gate open positions respectively in solid and broken lines.
Figure 2:
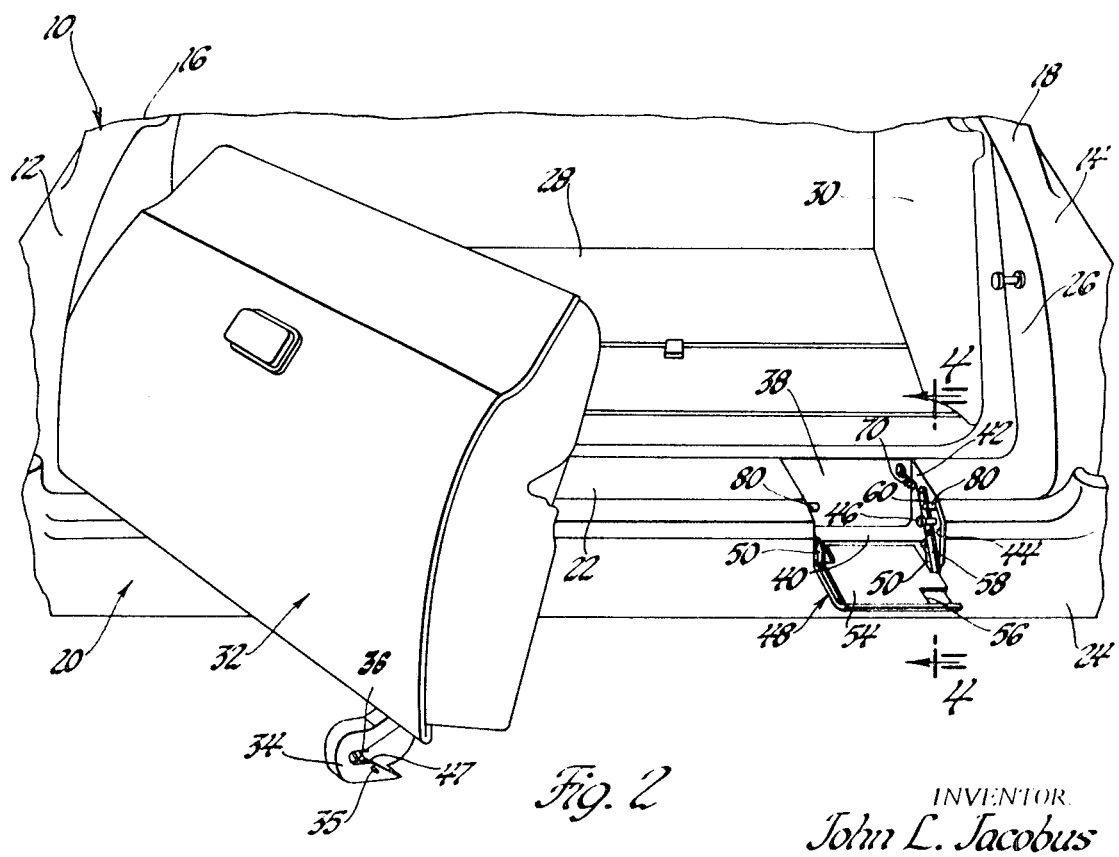
FIG. 2 is a fragmentary perspective view of the rear portion of a vehicle body having a closure installation according to this invention and showing the tailgate in the door open position.

Referring now to FIGS. 1 and 2 of the drawings, a station-wagon-type vehicle body generally designated 10 includes left and right quarter panel structures 12 and 14 having integral rear pillar structures 16 and 18 extending respectively generally vertically therefrom. A rear bumper structure generally designated 20 extends transversely of the vehicle body between the quarter panel structures and includes a sill structure 22 generally integral with the quarter panel structures and a bumper member 24 rigidly secured to the vehicle body and generally protecting the sill structure 22 and the lower portion of the quarter panel structures against impacts. The bumper structure cooperates with the quarter panel structures, the pillar structures, and the vehicle roof structure, not shown, to define a conventional rear opening 26 through which access may be had to the interior of the vehicle body which includes a load floor 28 and a right-side trim panel 30, FIG. 2.

As best seen in FIGS. 1 and 2, the lower portion of the rear opening 26 is closed by a primary closure or tailgate 32 which is operable either as a door or as a drop-gate to expose the rear opening 26. At the left side thereof, FIG. 1, the tailgate is vertically hinged on the vehicle body by a biaxial hinge at the lower corner and by a first releasable hinge-latch at the upper corner for swinging movement as a door between a closed position, shown in solid lines in FIG. 1, and a door open position, FIG. 2. At the lower margin thereof, the tail-gate is horizontally hinged on the vehicle body by the aforementioned biaxial hinge at the left side and by a second releasable hinge-latch at the right side for movement as a drop-gate between the aforementioned closed position and a drop-gate open position, shown in broken lines in FIG. 1.

Figure 3:
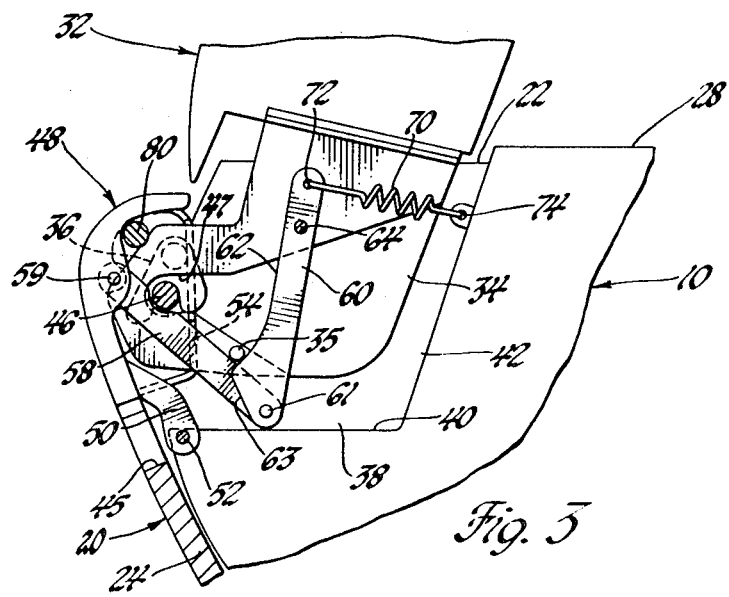
FIG. 3 is an enlarged sectional view taken generally along the plane indicated by lines 3—3 in FIG. 1.

As best seen in FIGS. 2 and 3, the second releasable hinge-latch includes a rigid support structure 34 depending below the lower margin of the tailgate and rigidly carrying a control pin 35 and a latch mechanism including a bifurcated latch bolt 36. To accommodate the support structure 34 in the closed position of the tailgate, the sill structure 22 includes a generally rectangular recess 38 having a horizontal bottom surface 40 and a pair of longitudinally extending vertical sides 42. To facilitate movement of the support structure 34 to and from the recess during operation of the tailgate as a door the bumper member 24 has a notch 44 therein registering with the recess 38, the notch including a pair of spaced grooves 45 in the bottom edge thereof, FIG. 1. A striker 46 is rigidly mounted on right vertical side 42 of the recess, FIG. 2, and is captured between a mouth portion 47 of the support structure 34 and the throat of the bifurcated latch bolt 36 in a latched position of the latter and in the closed position of the tailgate, FIG. 3. Thus captured, the striker 46 prevents separation of the lower right corner of the tailgate from the vehicle body and, consequently, operation of the tailgate as a door. The latch bolt 36 and support structure 34 are, however, rotatable relative to the striker 46 which is predeterminedly positioned on the bumper structure 20 to extend along the horizontal swing axis of the tailgate so that the striker functions as the hinge pintle for the right side hinge during operation of the tailgate as a drop gate. For a more detailed description of the biaxial hinge and the first and second hinge latches, and for a more detailed description of the operation of the tailgate, reference may be made to the copending application of Bela Sandor, Ser. No. 845,422, assigned to the assignee of this invention.

Figure 4:
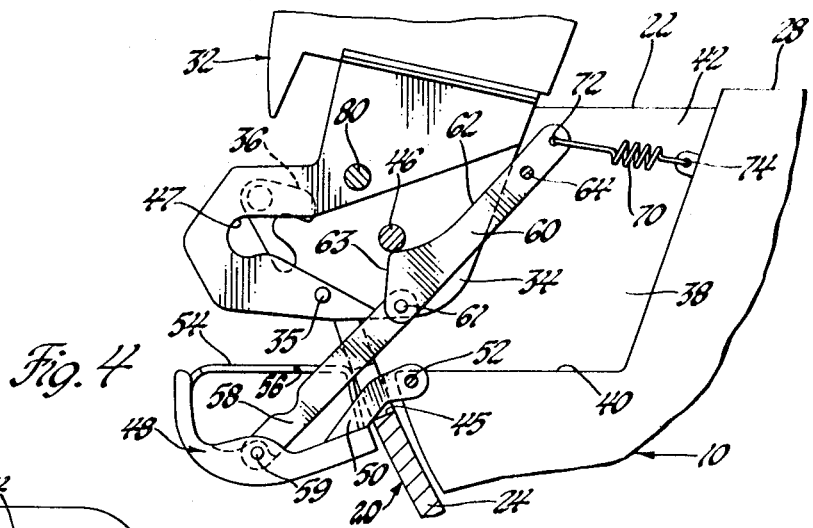
FIG. 4 is an enlarged sectional view taken generally along the plane indicated by lines 4—4 in FIG. 2 and showing the tailgate in a position approaching the closed position.
Figure 5:
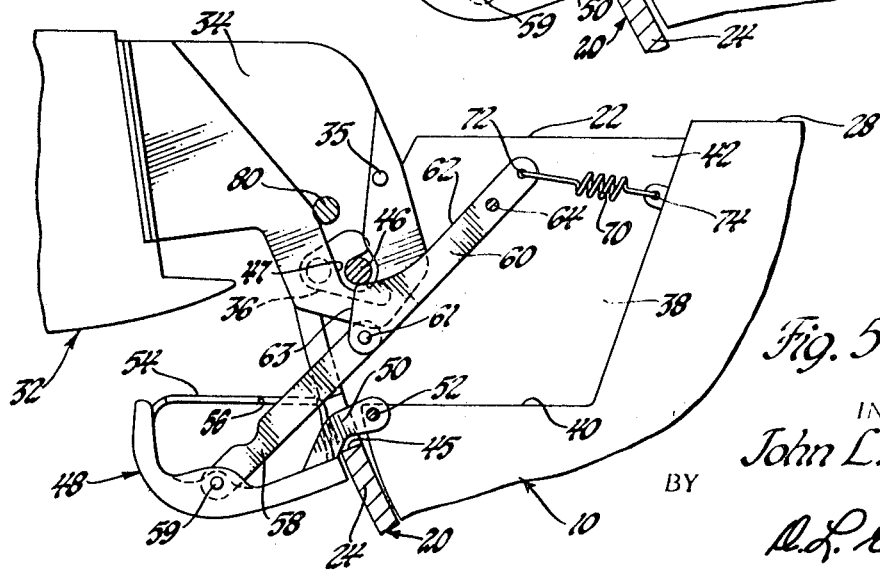
FIG. 5 is similar to FIG. 4 but showing the tailgate in the drop gate open position.

For purposes of protecting the depending support structure 34 in the closed position of the tailgate and for maintaining continuity of appearance across the notch 44 in the bumper member 24, a secondary closure installation according to this invention is provided. More particularly, with reference to FIGS. 2 and 3, the secondary closure installation includes a secondary closure 48 generally corresponding in size and configuration to the notch 44 in the bumper member 24. A pair of upstanding tabs 50 are rigidly secured, as by welding, in spaced relationship to the inside surface of secondary closure 48 and a pair of rivets rigidly secured to the sill structure 22 generally on opposite sides of the recess 38 each rotatably support a distal end of a respective one of the upstanding tabs, only rivet 52 rotatably supporting right side tab 50 being shown in FIGS. 3, 4 and 5. The rivets support the secondary closure 48 on the bumper structure for movement between a closed position, FIGS. 1 and 3, concealing the notch 44 and recess 38 and an open position, FIGS. 2, 4 and 5, wherein respective ones of the tabs 50 are situated within corresponding ones of the spaced grooves 45. As best seen in FIGS. 2, 4 and 5, a filler or step plate 54 having a generally rectangular aperture 56 therein is rigidly secured to the secondary closure 48 and defines in the open position of the latter a horizontal surface generally contiguous with the bottom surface 40 of the recess 38 in the sill structure.

Link means are provided between the bumper structure and the secondary closure and define the open position of the latter by limiting counterclockwise movement thereof. More particularly, with reference to FIGS. 3, 4 and 5, the link means include a first link 58 having one end thereof pivotally connected to the secondary closure at 59 and the other end pivotally connected to a second link 60 at 61. Second link 60 includes contiguous cam edges 62 and 63 and is rotatably supported intermediate its ends on a rivet 64 rigidly mounted on right vertical side 42 of the recess 38. A coil tension spring 70 has one end attached to the free end of the second link 60 at 72 and has the other end attached to the bumper structure 20 at 74 to thereby normally bias the second link clockwise, FIG. 3.

In the position of the first and second links shown in FIG. 3 corresponding to the closed position of the secondary closure, the spring 70 is extended and unless otherwise restrained will rotate the second link clockwise, initiating counterclockwise pivotal movement of the secondary closure through the first link 58 which will continue until the first and second links reach coaxial position, FIGS. 2, 4 and 5, whereupon the secondary closure assumes the open position. So positioned, the weight of the closure is sufficient to overcome spring 70 and maintain the open position. In the open position of the secondary closure the cam edge 62 engages the striker 46, the latter functioning to prevent the first and second links from achieving an overcenter position. With the secondary closure thus opened, vertical force reactions thereon, such as would be imposed by a person standing on the filler plate 54, are resisted in tension by the first and second links.

Referring now to FIGS. 2 and 4, in the door open position of the tailgate the unrestrained spring 70 and the first and second links 58 and 60 function to position the secondary closure in the open position wherein the latter cooperates with the bottom surface 40 of the recess to define a step on the vehicle body below the level of load floor 28. As the tailgate approaches the closed position from the door open position, FIG. 4, the support structure 34 passes over the generally horizontal secondary closure and the control pin 35 thereon contacts the second link 60 on the cam edge 63 thereof. Thereafter, as the tailgate continues swinging movement toward the closed position, the control pin rotates the second link counterclockwise against spring 70 causing the first link 58 to rotate the secondary closure clockwise toward the closed position behind the tailgate as the support structure passes over. When the tailgate reaches the closed position and the latch bolt 36 captures the striker 46, the control pin bears against the cam edge 62 to maintain the first and second links in the positions shown in FIG. 3 corresponding to the closed position of the secondary closure with the trailing edge of the support structure 34 protruding through aperture 56 in the filler plate 54. As best seen in FIGS. 2 and 3, a pair of stub shafts 80 rigidly mounted on opposite vertical sides 42 of the recess 38 protrude a short distance into the recess and reinforce the upper portion of the secondary closure in the closed position thereof against impacts from rearward of the bumper structure thereby isolating the support structure and tailgate from such impacts.

From the closed position thereof, operation of the tailgate in the drop gate mode initiates counterclockwise rotation of the support structure 34 and control pin 35 about the striker 46. More particularly, as the control pin traverses a circular arc about the striker it generally follows the curvature of cam edge 62 of the second link 60 so that neither motion of the second link nor motion of the secondary closure occurs. After a predetermined amount of drop gate movement of the tailgate, however, the path of the control pin diverges from the cam edge 62, thus removing the restraint on spring 70 and permitting the latter, through the first and second links, to rotate the secondary closure to the open position thereof, FIG. 5, in advance of the tailgate. Of course, return movement of the tailgate from the drop gate open to the closed position causes the control pin to traverse the same arcuate path in the opposite direction, thus initiating corresponding reverse movement of the secondary closure behind the tailgate.

From the closed position of the tailgate, release of the striker 46 by latch bolt 36 initiates operation of the tailgate as a door. As the support structure 34 begins to separate from the striker during initial door movement of the tailgate, the restraint on spring 70 provided by the control pin 35 is removed. The spring then becomes operable through the first and second links to rotate the secondary closure from the closed to the open position in advance of the opening tailgate, FIG. 4.

Having thus described the invention, what is claimed is:

1. In a vehicle body having an access opening therein and including a primary closure mounted thereon for movement as a drop gate between a closed position and a first open position and for movement as a door between said closed position and a second open position, and a bumper structure adjacent the lower margin of said opening having recess means therein defining a step surface on said vehicle body below the level of a load floor therein in said first open position of said primary closure, a secondary closure installation comprising a secondary closure, means mounting said secondary closure on said bumper structure for movement between a closed position substantially concealing said recess means and an open position exposing said recess means and providing an extension to said step surface on said vehicle body, and control means on said bumper structure and on said primary closure operable upon movement of said closure from said closed to said second open position to move said secondary closure from said closed to said open position in advance of said primary closure and upon movement of said primary closure from said second open position to said closed position being operable to move said secondary closure from said open to said closed position behind said primary closure.

2. In a vehicle body having an access opening therein and including a primary closure mounted thereon for movement as a drop gate between a closed position and a first open position and for movement as a door between said closed position and a second open position, said primary closure having a hinge latch support structure depending substantially below the lower margin thereof, and a bumper structure adjacent the lower margin of said opening having recess means therein for receiving said depending support structure in said closed position of said primary closure and during movement of the latter between said closed and said first open positions, a secondary closure installation comprising a secondary closure, means mounting said secondary closure on said bumper structure for pivotal movement about a generally horizontal axis of the latter between a closed position substantially concealing said recess means and an open position exposing said recess means, link means between said bumper structure and said secondary closure selectively operable to move said secondary closure between said open and said closed positions, spring means operable to bias said secondary closure toward said open position, link control means on said support structure engageable on said link means during movement of said primary closure from either of said first and said second open positions to said closed position, said link control means thereafter activating said link means to move said secondary closure from said open to said closed position behind said primary closure and against the bias of said spring means, and reinforcing means on said bumper structure engageable on said secondary closure in said closed position thereof to reinforce said secondary closure against impacts thereon.

3. In a station-wagon-type vehicle body having a rear opening therein and including a tailgate mounted thereon for movement as a drop gate between a closed position and a first open position and for movement as a door between said closed position and a second open position, said tailgate having a hinge latch support structure depending substantially below the lower margin thereof, and a bumper structure adjacent the lower margin of said rear opening having recess means therein for receiving said support structure in said closed position of said tailgate and during movement of the latter between said closed and said first open position, said recess means in said second open position of said tailgate defining a generally horizontal step surface on said bumper structure below the lower margin of said rear opening, a secondary closure installation comprising a secondary closure, means mounting said secondary closure on said bumper structure for pivotal movement about structure between a generally horizontal axis of said bumper structure between a closed position substantially concealing said recess means and an open position exposing said recess means means on said secondary closure defining in said open position of the latter a horizontal surface generally contiguous with said step surface defined by said recess means, a first link having one end pivotally connected to said secondary closure and the other end pivotally connected to one end of a second link, said second link being rotatably supported on said bumper structure and upon rotary movement thereof being operable through said first link to pivot said secondary closure between said open and said closed positions, spring means biasing said second link toward a position corresponding to said open position of said secondary closure in either of said first and said second open positions of said tailgate, a control pin rigidly mounted on said depending supporting structure, said control pin being engageable on said second link during movement of said tailgate from either of said first and second open positions to said closed position and thereafter being operable to rotate said second link against said spring means thereby to pivot said secondary closure from said open to said closed position behind said tailgate, and reinforcing means on said bumper structure engageable on said secondary closure in said closed position thereof to reinforce said secondary closure against impacts thereon.

* * * * *